(12) United States Patent
Chou

(10) Patent No.: US 6,453,561 B1
(45) Date of Patent: Sep. 24, 2002

(54) EFFORT-SAVING LOOPING SHEARS

(76) Inventor: Hwei-Rung Chou, 8F., No. 341, Sec. 4, Sinyi Rd., Taipei (TW)

( * ) Notice: Subject to any disclaimer, the term of this patent is extended or adjusted under 35 U.S.C. 154(b) by 0 days.

(21) Appl. No.: 09/956,101

(22) Filed: Sep. 20, 2001

(51) Int. Cl.⁷ .............................................. B26B 13/28
(52) U.S. Cl. .............................. 30/266; 30/250; 30/271
(58) Field of Search ........................ 30/250, 266, 270, 30/271

(56) References Cited

U.S. PATENT DOCUMENTS

| | | | | |
|---|---|---|---|---|
| 3,791,032 A | * | 2/1974 | Rogers | 30/271 |
| 5,787,589 A | * | 8/1998 | Auderset | 30/261 |

FOREIGN PATENT DOCUMENTS

| | | | | |
|---|---|---|---|---|
| FR | 913871 | * | 6/1946 | 30/266 |
| FR | 972681 | * | 8/1950 | 30/266 |

* cited by examiner

Primary Examiner—Hwei-Slu Payer
(74) Attorney, Agent, or Firm—Varndell & Varndell, PLLC

(57) ABSTRACT

A pair of looping shears for gardening purpose to allow its user the optimal cutting angle while trimming twigs, comprised of strike jaw, blade jaw and effort-saving mechanism; within, a ratchet is provided to a pivot of the blade jaw that synchronously turns with the strike jaw, and a mobile tab engaged with the ratchet and the handle of the blade jaw to achieve comfortable grip on the handles at an optimal angle for applying the force to repeat trimming twigs and branches.

9 Claims, 6 Drawing Sheets

EFFORT-SAVING LOOPING SHEARS

BACKGROUND OF THE INVENTION (a) Field of the Invention

The present invention relates to a pair of effort-saving looping shears for trimming twigs and branches, and more particularly to one that allows easy grip of its handles at optimal angle.

(b) Description of the Prior Art

Most of the conventional crocodile shears (10) for gardening purpose are comprised of a fixed jaw (101) pivoted to a mobile jaw (102) as illustrated in FIG. 1 with the blade of the mobile jaw (102) practically doing all the trimming. However, said crocodile shears (10) is not provided with an effort-saving mechanism, the user has to grip onto both handles of the crocodile shears and open them up to the maximal degree before executing any trimming, which becomes tiresome and does not meet ergonomics.

An improved design of the crocodile shears (20) provided with an effort-saving mechanism (according. to U.S. Pat. No. 5,689,888) as illustrated in FIG. 2 essentially relates to one that has multiples of toothed sector (203) on the outer side of a fixed jaw (201) with a handle (204) and a mobile jaw (202) being separately pivoted, another toothed sector (205) engaging the toothed sector (203) for both toothed sectors (203)(205) to achieve effort-saving purpose in applying the gardening crocodile shears. However, no substantial effort-saving is achieved by the structure comprised of said toothed sectors (203) (205) for merely relying upon the engagement between them and both handles must be opened up to approximately 180 degrees before executing the cutting and making it difficult to apply the force to close in the handles. That is, said effort-saving mechanism again does not meet ergonomics for failing to provide the optimal angle for force application by both arms of the user.

Another improvement for effort-saving mechanism(30), (e.g. ROC Publication No. 264606) as illustrated in FIG. 3 includes a fixed jaw (301), a mobile jaw (302), handles (303)(304) and a link (305). Wherein, a row of ratchet (3021) is provided on the lower arm of the mobile jaw (302) to be pivoted to the link (305) to the handle (304) by insertion of a pin (306) so that by adjusting the position of the pin (306) to engage the ratchet (3021) to achieve the effort-saving purpose. However, while working, it takes to gradually adjust the engagement position for said pin (306) in the ratchet (3021) and the chance of having skipped or stuck ratchet is considerably high. Particularly, usually the engagement position forthwith skips from the last tooth to the first tooth of the ratchet (3021) as the motion of the link (305) is subject to pull by a coil (307). Again, the improvement does not meet ergonomics by failing to allow control wherein the force can be comfortably applied.

To correct those defects described above, the prevent invention comprised of a strike jaw, a blade jaw, a pivot and an effort-saving mechanism by having said pivot provided with a ratchet that synchronously turns with the blade piece of the blade jaw, a mobile tab being provided to a handle, said mobile table being engaged to the ratchet in a direction adjustable for the user to open up both handles for an optimal angle to repeat applying the force as desired to trim twigs and branches with comfort.

SUMMARY OF THE INVENTION

The primary purpose is to provide a structure of effort-saving looping shears for gardening purpose by the engagement of a ratchet and a mobile tab to repeat opening up both handles to an optimal degree meeting ergonomics for applying the force for a comfortable trimming.

DETAILED DESCRIPTION OF THE PREFERRED EMBODIMENTS

Figure 4:
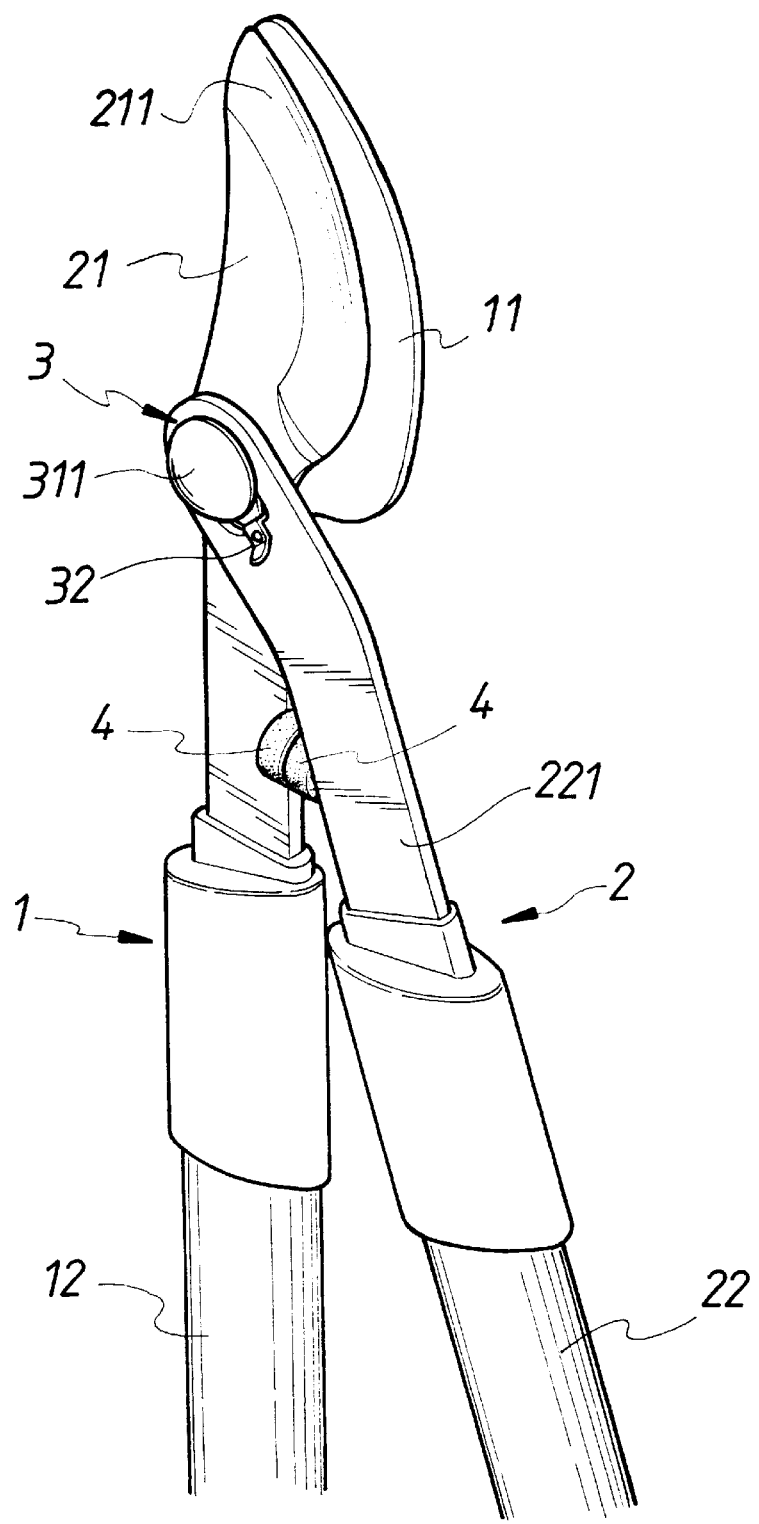
FIG. 4 is a perspective view partially showing an assembly of a preferred embodiment of the present invention.
Figure 5:
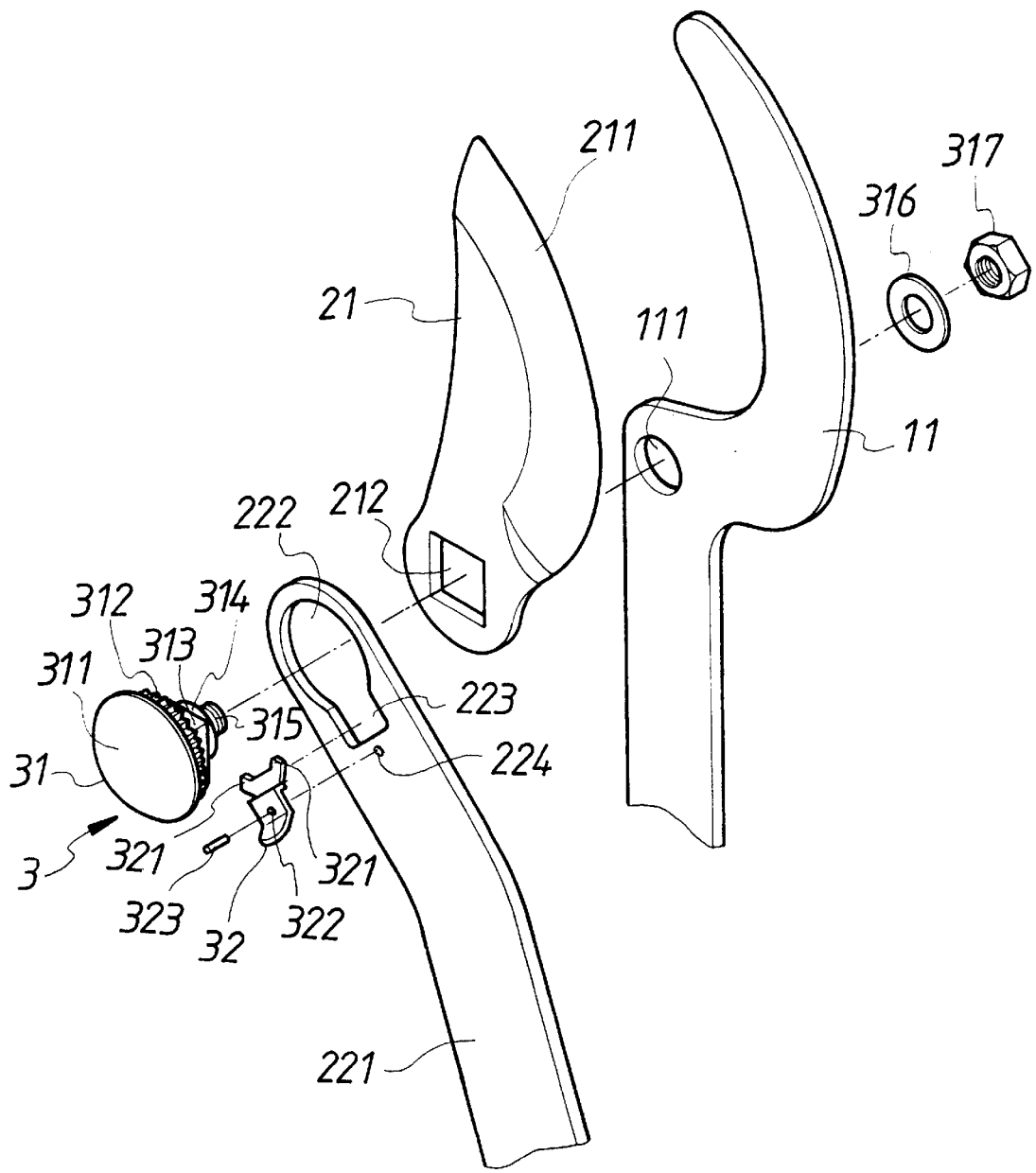
FIG. 5 is a perspective view showing part of the preferred embodiment of the present invention before the assembling.

Referring to FIGS. 4 and 5, a pair of looping shears of the present invention includes a strike jaw (1), a blade jaw (2) and an effort-saving mechanism (3), wherein, said strike jaw (1) as illustrated in FIG. 5 being comprised of a strike piece (11) and a handle (12) with said strike piece (11) related to an arc curved inwardly, a circular pivot hole (111) being provided at a selected location below the strike piece (11), and said handle (12) being a known long stick directly fixed to the lower end of the strike piece (11) to form the strike jaw (1).

Said blade jaw (2) as illustrated in FIG. 5 includes a blade piece (21) and another handle (22) with an arc tip (211) formed on the front edge of the blade piece (21), a rectangular pivot hole (212) being provided at where selected on the lower side of the blade piece (21), said handle (22) being a known long stick having at its front section fixed with a sheet iron (221), a circular through hole (222) in the one end of the sheet iron (221), a rectangular slot (223) at the lower edge of the through hole (222), and a pin hole (224) below the rectangular slot (223) for the effort-saving mechanism (3) to be adapted to the rectangular pivot hole (212) with the circular through hole (222) to form the blade jaw (2).

Said effort-saving mechanism (3) as illustrated in FIG. 5 comprised of a ratchet pivot (31) and a mobile tab (32), within, a circular bonnet (311) being formed at the top of the ratchet pivot (31), a ratchet (312) to the lower section of the bonnet (311) while the lower part of the ratchet (312) related to a rectangular section (313) and the lower part of the rectangular section (313) related to a cylindrical section (314), a threaded section (315) being provided at the center of the tail of said cylindrical section (314) to form the ratchet pivot (31) pivoted to the strike jaw (1) and the blade jaw (2) with a packing (316) and a nut (317); said mobile tab (32) curved to from graded levels with both sides of the lower lever respectively protruding a tooth (321) to engage the ratchet (312) of the ratchet pivot (31) while a circular hole (322) being separately provided in the upper lever of the mobile tab (32) to receive insertion of a pin (323).

Figures 6, 7:
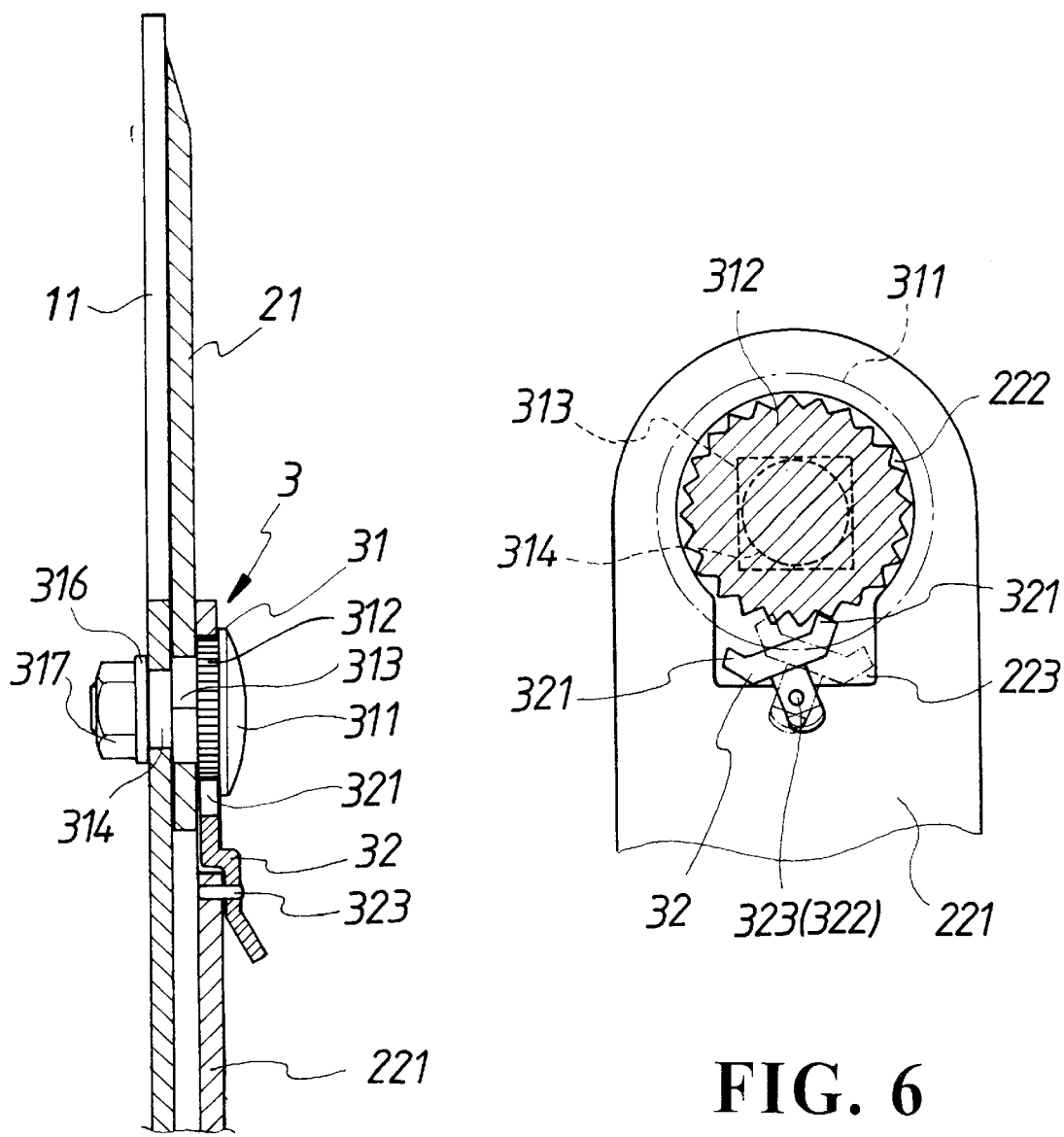
FIG. 6 is a schematic view of a mobile tab and a ratchet of the preferred embodiment of the present invention.
FIG. 7 is a sectional view showing part of an assembly of the preferred embodiment of the present invention.

Now referring to FIGS. 6 and 7, the ratchet pivot (31) of the effort-saving mechanism penetrates the circular through hole (222) at the front end of the sheet iron (221) of the blade jaw for the ratchet (312) merely being accommodated in the circular through hole (222); the mobile tab (32) penetrates the circular through hole (322) and the pin hole (224) to be secured to the blade piece (21) with the pin (323); and the lower lever of the mobile tab (32) engages the ratchet (312) in the slot (223) to form the effort-saving mechanism (3). Said ratchet pivot (31) has its rectangular section (313) to penetrate the rectangular pivot hole (212) in the blade piece (21) for the rectangular pivot hole (212) of the blade piece (21) to receive insertion by the rectangular section (313) to execute synchronous turning in forming the blade jaw (2) of the pair of the looping shears with the blade piece (21) and the handle (22). The threaded section (315) of the ratchet pivot (31) penetrating the circular pivot hole (111) in the strike jaw (1) and secured in position with a packing (316) and a nut (317) for the strike jaw (1) to be pivoted and overlapped with the blade jaw (2) to form a pair of looping shears of the present invention as illustrated in FIG. 4.

Figure 8:
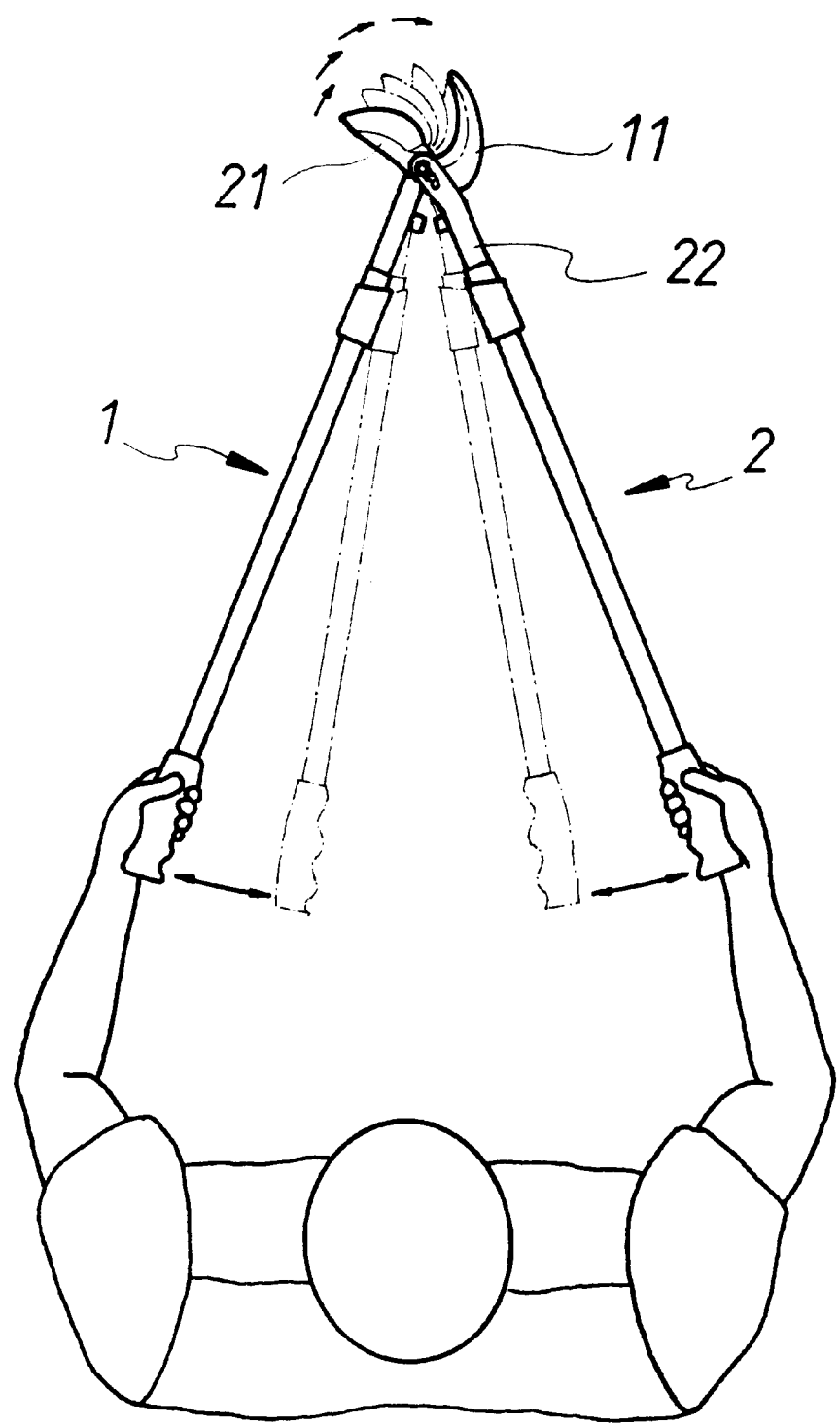
FIG. 8 is a schematic view of the preferred embodiment of the present invention in use.

Now referring to FIG. 6, the mobile tab (32) of the blade jaw (2) is moved by finger for the tooth (321) on one side of the mobile (32) to engage the ratchet (312) to indicate a structure for one-way looping by finger, thus for the user to open up both handles (12)(22) for an optimal degree to apply the force as illustrated in FIG. 8. Upon closing in both of said handles (12)(22), the ratchet pivot (31) and the blade piece (21) synchronously and gradually loop to close in as driven by the mobile tab (32) for a comfortable trimming even in case of some rough twigs.

Figure 1:
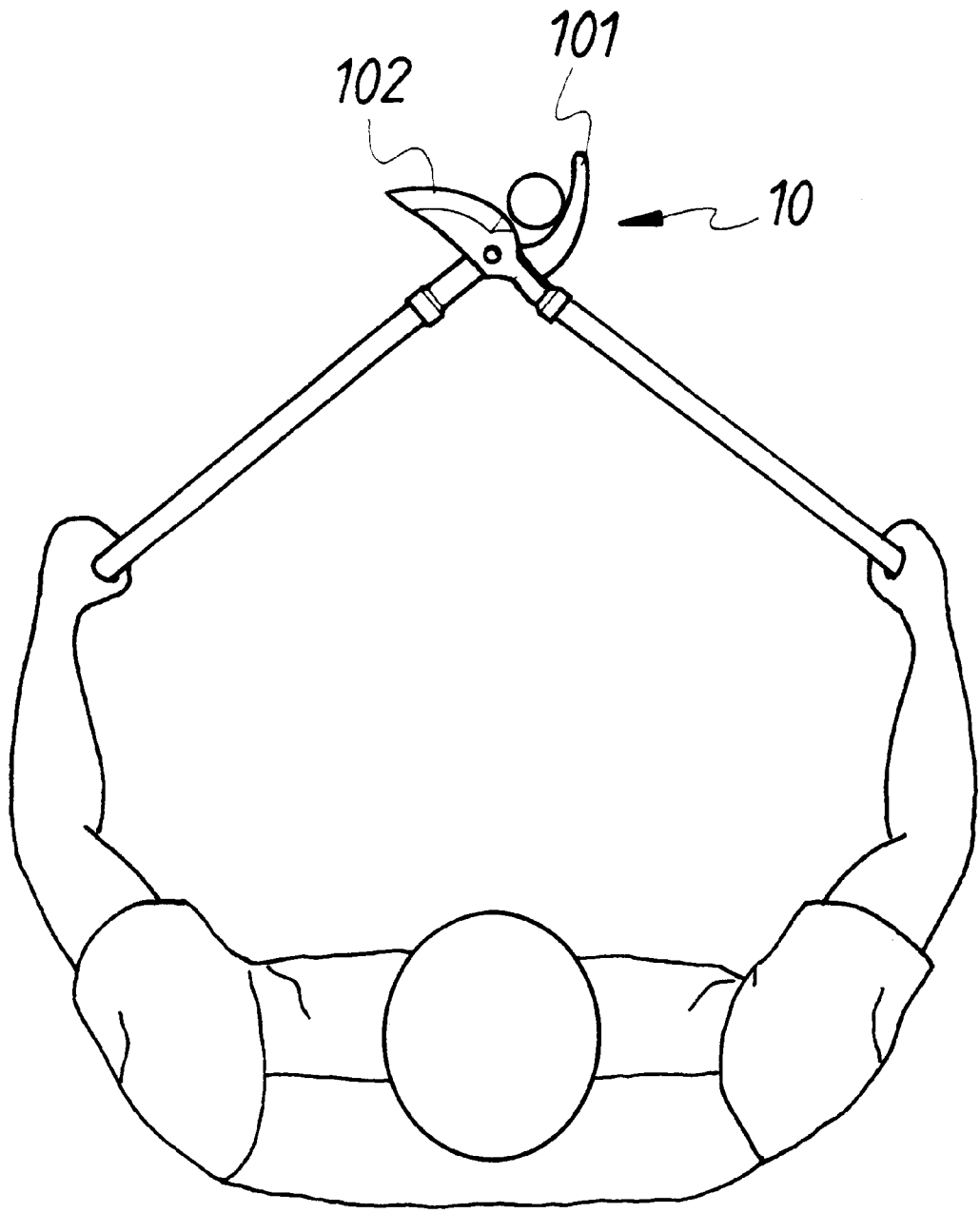
FIG. 1 is a schematic view of the prior art of a pair of crocodile shears.
Figure 2:
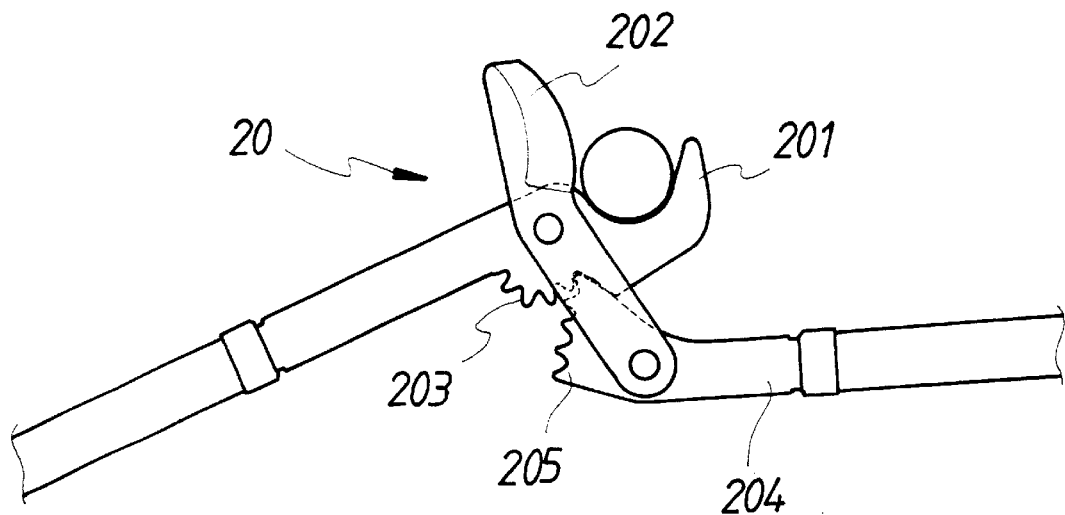
FIG. 2 is a schematic view of a pair of effort-saving crocodile shears of the prior art.
Figure 3:
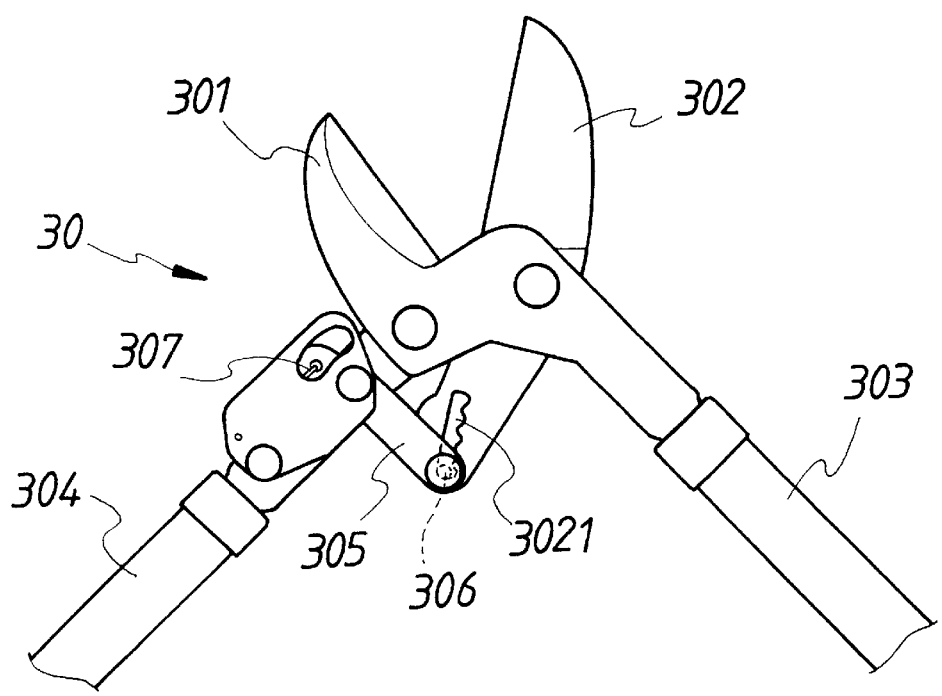
FIG. 3 is a schematic view of another pair of effort-saving crocodile shears of the prior art.

Whereas the present invention permits the optimal opening degree between said two handles (12)(22) to repeat trimming with the effort-saving mechanism, defectives as observed in the prior art illustrated in FIGS. 1 and 2 are corrected. The user while opening up said two handles (12)(22) does not have to open his arms too wide and thus to prevent fatigue and sore muscles. That is, the present invention achieves effort-saving effect by meeting ergonomics. Furthermore, as the mobile tab (32) of the effort-saving mechanism drives the ratchet pivot (31) and the blade piece (21) for a progressive closing in for trimming twigs, the user simply repeats control over opening up and closing in by gripping both handles (12)(22) without having to stop to execute careful adjustment of the engagement position required in the prior art as illustrated in FIG. 4. The present invention not only meets ergonomics, warrant effort saving, but also is practical in application.

Provided, however, that the art and the primary purpose of the present invention are taking advantage of the configuration for the incorporation of the effort-saving mechanism, the blade piece (21) and the handle (22) to achieve the purpose of comfortable application of force and easy operation of the looping shears. Therefore, structures of the strike jaw (1), length and form of both handles (12)(22) are not limited to those disclosed in the preferred embodiments. As illustrated in FIG. 4, a buffer (4) made of soft plastic or rubber material is each provided on both inner sides of both handles (12)(22) to reduce impact created upon closing in both handles (12)(22). Alternatively, the rectangular pivot hole (212) in the blade piece (21) and the rectangular section (313) of the ratchet pivot (31) may be provided in hexagonal or other polygonal form. It is to be noted that any summary alteration and/or replacement by operating the art disclosed in the present invention shall fall within the scope and spirits of the art of the present invention.

What is claimed is:

1. A pair of looping shears with effort-saving mechanism for gardening purpose comprised of a strike jaw, a blade jaw and an effort-saving mechanism; the strike jaw including a strike piece mounted to a handle, the blade jaw including a blade piece pivoted to another handle, the effort-saving mechanism including a ratchet and a mobile tab, the mobile tab having a tooth respectively protruding from both sides thereof for pivoting the blade jaw and the strike jaw to overlap each other, the ratchet being provided at the blade jaw of the pair of looping shears to execute synchronous turning with the blade jaw, the mobile tab being pivoted to the handle of the blade jaw for engaging the ratchet with its teeth thereby causing the mobile tab to link motion of the ratchet when the handles operate, and an edge of the blade piece of the blade jaw having a blade tip, a lower surface of the blade piece having a rectangular pivot hole, the handle of the blade jaw including a long stick having a sheet iron secured to its front section, an end surface of the sheet iron having a circular through hole, a lower edge of the through hole including a rectangular slot, and a pin hole being provided in a surface of the sheet iron below the rectangular slot.

2. A pair of looping shears with effort-saving mechanism for gardening purpose as claimed in claim 1, wherein the strike piece of the strike jaw includes an arc curving inwardly between a straight part and a curved part, a pivot hole being provided in the arc, and the handle of the strike jaw including a long stick having a sheet iron secured to its front section.

3. A pair of looping shears with effort-saving mechanism for gardening purpose as claimed in claim 2, wherein a buffer made of soft material is provided on an inner side of one of said handles to reduce impact created while closing up the handles.

4. A pair of looping shears with effort-saving mechanism for gardening purpose comprised of a strike jaw, a blade jaw and an effort-saving mechanism; the strike jaw including a strike piece mounted to a handle, the blade jaw including a blade piece pivoted to another handle, the effort-saving mechanism including a ratchet and a mobile tab, the mobile tab having a tooth respectively protruding from both sides thereof for pivoting the blade jaw and the strike jaw to overlap each other, the ratchet being provided at the blade jaw of the pair of looping shears to execute synchronous turning with the blade jaw, the mobile tab being pivoted to the handle of the blade jaw for engaging the ratchet with its teeth thereby causing the mobile tab to link motion of the ratchet when the handles operate, and the ratchet of the effort-saving mechanism including a ratchet pivot, the ratchet pivot passing through and securing the blade jaw and the strike jaw to allow synchronous looping by the ratchet pivot and the blade jaw, a bonnet being provided to a top of the ratchet pivot of the effort-saving mechanism so that the ratchet is provided at a lower section of the bonnet, a lower part of the ratchet having a rectangular section and a cylindrical section, and a tail of the cylindrical section being threaded.

5. A pair of looping shears with effort-saving mechanism for gardening purpose as claimed in claim 4, wherein the strike piece of the strike jaw includes an arc curving inwardly between a straight part and a curved part, a pivot hole being provided in the arc, and the handle of the strike jaw including a long stick having a sheet iron secured to its front section.

6. A pair of looping shears with effort-saving mechanism for gardening purpose as claimed in claim 5, wherein a buffer made of soft material is provided on an inner side of one of said handles to reduce impact created while closing up the handles.

7. A pair of looping shears with effort-saving mechanism for gardening purpose comprised of a strike jaw, a blade jaw and an effort-saving mechanism; the strike jaw including a strike piece mounted to a handle, the blade jaw including a blade piece pivoted to another handle, the effort-saving mechanism including a ratchet and a mobile tab, the mobile tab having a tooth respectively protruding from both sides thereof for pivoting the blade jaw and the strike jaw to overlap each other, the ratchet being provided at the blade jaw of the pair of looping shears to execute synchronous turning with the blade jaw, the mobile tab being pivoted to the handle of the blade jaw for engaging the ratchet with its teeth thereby causing the mobile tab to link motion of the ratchet when the handles operate, the mobile tab curving and forming upper and lower steps, said teeth respectively protruding from both ends of the lower step and having a flushed end for engaging the ratchet, and a circular hole being provided in the upper step and receiving a pin for securing the mobile tab to the handle of the blade jaw.

8. A pair of looping shears with effort-saving mechanism for gardening purpose as claimed in claim 7, wherein the strike piece of the strike jaw includes an arc curving inwardly between a straight part and a curved part, a pivot hole being provided in the arc, and the handle of the strike jaw including a long stick having a sheet iron secured to its front section.

9. A pair of looping shears with effort-saving mechanism for gardening purpose as claimed in claim 8, wherein a buffer made of soft material is provided on an inner side of one of said handles to reduce impact created while closing up the handles.

\* \* \* \* \*